Sept. 6, 1966   C. W. MILLER ETAL   3,271,577
LIGHT COLLECTOR FOR PHOTOSENSITIVE ELEMENTS
Filed June 20, 1963
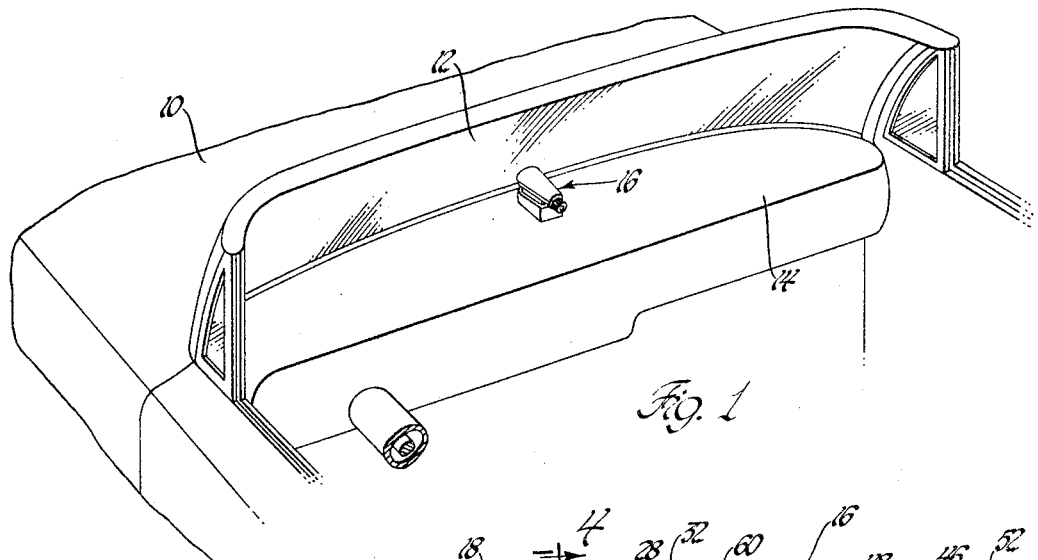
Fig. 1
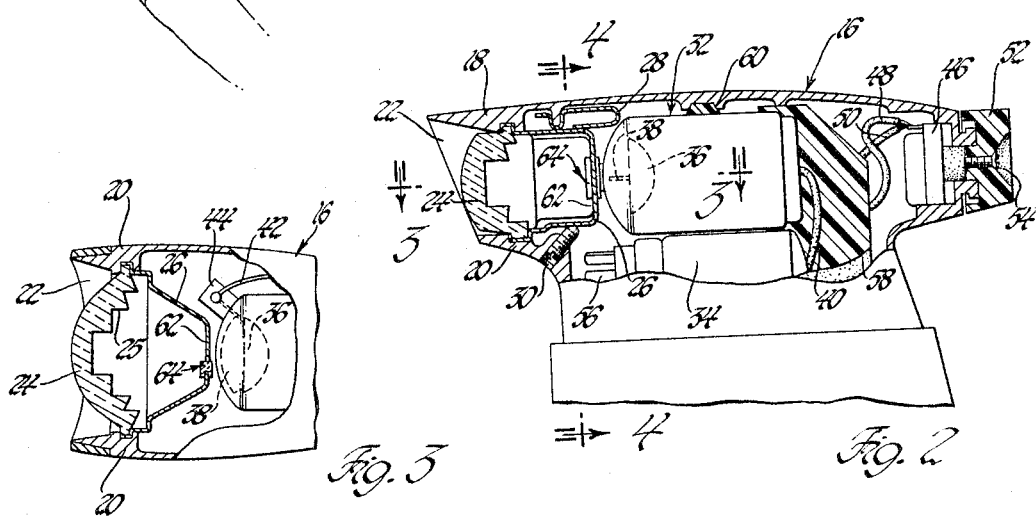
Fig. 3
Fig. 2
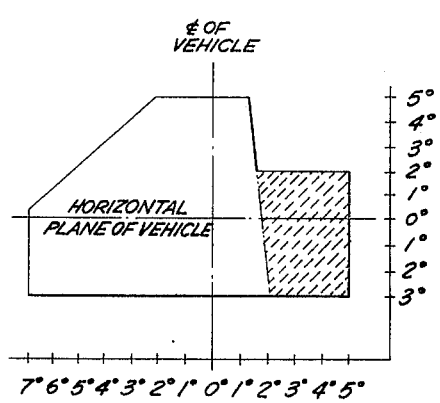
Fig. 6
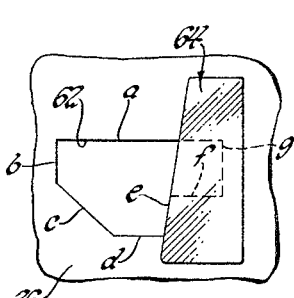
Fig. 4
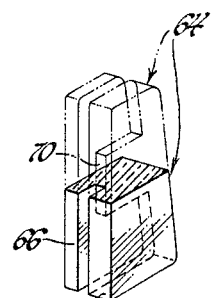
Fig. 5
INVENTORS
William E. Griner, &
BY Charles W. Miller
Paul J. Ethington
ATTORNEY

United States Patent Office 3,271,577
Patented Sept. 6, 1966

3,271,577
LIGHT COLLECTOR FOR PHOTOSENSITIVE ELEMENTS
Charles W. Miller, Anderson, and William E. Griner, Pendleton, Ind., assignors to General Motors Corporation, Detroit, Mich., a corporation of Delaware
Filed June 20, 1963, Ser. No. 289,246
4 Claims. (Cl. 250—239)

This invention relates to light-responsive devices and more particularly to an improved light collector for photosensitive elements of the type shown in the patent to Onksen et al. 2,762,930.

One of the basic problems in providing a vehicle with an automatic headlamp dimming system is the necessity to provide adequate means for gathering light only from within a predetermined field of response. For proper operation of the system, it is necessary that the photosensitive element, which is housed in the light collector, be shielded from sources which might cause undesirable dimming action such as street lights or reflections from the road or from signs located along the sides of the road.

Prior art systems have not proven entirely satisfactory. Primarily, this is due to the fact that under certain circumstances the location of both desirable and undesirable sources of dimmer system actuation is approximately the same. For example, it is desirable that the system dim for approaching vehicles on right-hand turns and yet not be affected by signs and other lights located on the right-hand side of the road. Further, it is desirable that the light collector be aimed such that the system dims and holds in response to light emanating from the tail lights of a passing vehicle or a vehicle approached from the rear and yet not be responsive to the vehicle's own headlights reflecting from the road back into the light collector.

In each of the aforementioned examples, the light approaches the light collector from approximately the same location and shielding of the photosensitive element from the undesirable source has heretofore necessarily shielded the photosensitive element from the desirable source of dimmer system actuation. Additionally, the reliability of prior art light collectors, such as shown in the aforementioned patent, has been adversely affected by car loading. Since the lower vertical acceptance angle of the light collector is restricted to about 2° due to reflected light from the road of the vehicle's own headlamps, heavy loads in the trunk of the vehicle cause the aim on the light collector to approach horizontal and in some cases renders the system practically useless.

The present invention overcomes the aforementioned deficiencies of the prior art light-collecting means by providing a light collector having an optical system comprising a novel shielding and filtering means. The shielding means has an irregular-shaped aperture therein so that a predetermined field of response for the photosensitive element is obtained. The filter is placed over a portion of the aperture to greatly reduce the response of the photosensitive element to light emanating from a source located to the right of the centerline of the vehicle. This reduction in light from the right-hand side permits a lower vertical acceptance angle which is greater than heretofore obtainable without the system being adversely affected by the reflection of the vehicle's own headlights. This greater "down" angle reduces the effect of car loading on the operation of the system and permits the system to dim more readily and remain dimmed for a greater distance in response to light from the tail lamps of vehicles pulling in front of or being approached by a vehicle equipped with the automatic headlamp dimming system. In addition the system is not affected by signs along the right-hand side of the road but is still responsive to lights of an approaching vehicle on right-hand turns.

For a better understanding of the invention, reference should be made to the following description to be read in conjunction with the accompanying drawings in which:

FIGURE 1 is a view showing the light collector mounted in position behind the windshield of a vehicle;
FIGURE 2 is a side view of the light collector with parts broken away;
FIGURE 3 is a view taken along lines 3—3 of FIGURE 2;
FIGURE 4 is an enlarged view of the aperture and filter combination taken along lines 4—4 of FIGURE 2;
FIGURE 5 is a perspective view of the filter;
FIGURE 6 is a graphic representation of the vertical and horizontal light acceptance angles to which the light collector is responsive.

Referring now to the drawings and initially to FIGURE 1, there is shown a vehicle 10 having a windshield 12 and a dashboard 14. A light collector 16 is mounted by suitable means on the dashboard 14 at approximately the midportion thereof and immediately behind the windshield 12 for the reception of light passing therethrough.

As more clearly shown in FIGURES 2 and 3, the light collector 16 comprises upper and lower opaque housing portions 18 and 20 respectively. The housing portions 18 and 20 are formed of a suitable material such as plastic or metal. With the housing portions 18 and 20 in assembled position, a light-transmitting opening 22 is provided at one end for receiving a light-condensing lens 24. In the embodiment shown, the lens 24 has a stepped structure as indicated generally at 25 so as to attain substantially uniform lens thickness; however, any suitable condensing lens structure will suffice. The lens 24 is carried by a shield 26 which is supported in the housing portions 18 and 20 by means of a spring 28 and a screw 30.

The light collector 16 houses a photosensitive element 32 and an electrometer tube 34. The photosensitive element 32 comprises a cathode 36 and an anode 38. The cathode 36 is connected to the electrometer tube grid lead (not shown) by means of a conductor 40. The anode 38 is connected to ground by means of a conductor 42 which is secured to the metal cap 44 on the photosensitive element 32. The cathode and heater (not shown) of the electrometer tube 34 are connected to a potentiometer assembly 46 by the conductors 48 and 50 respectively. Adjustment of the potentiometer assembly 46 is accomplished by means of a control knob 52 which is secured thereto by means of a screw 54. The electrometer tube 34 is provided with electrical contacts 56 connected by suitable electrical conductors to the control circuits of the headlamp dimming system. The photosensitive element 32 and the electrometer tube 34 are potted in a compound such as an epoxy resin which is molded and heat-cured to form an encapsulation 58. The encapsulation 58 is suitably supported in the upper and lower housings 18 and 20 as at 60 so that the photosensitive element 32 faces the opening 22 that is the element is positioned so that its cathode 36 which is the light-sensitive portion of the element faces the opening 22.

The shield 26 has an irregular-shaped aperture therein as indicated at 62 in FIGURE 3. The aperture 62 provides the only opening for the transmission of light from the housing opening 22 to the photosensitive element 32. The desired vertical acceptance angles of the system are obtained by adjustment of the vertical position of the lens and shield combination by means of the screw 30 (FIGURE 2). A filter 64 is molded in the shield 26 and covers a portion of the aperture 62. The filter 64 as best shown in FIGURE 5 comprises portions 66 and 68 integrally connected by the portion 70 and is made of a medium-red acrylic material. We prefer to mold or cut the filter 64 from a single integral piece of material; however, it could of course, be made of separate parts bonded in some suitable manner.

Referring now to FIGURE 4, the aperture 62 in the shield 26 is cut in the shape of a concave polygon having seven sides: *a, b, c, d, e, f,* and *g*. The sides "*a*," "*d*," and "*f*" are parallel to the horizontal plane of the vehicle and the sides "*b*" and "*g*" are parallel to the centerline of the vehicle and perpendicular to the sides "*a*," "*d*," and "*f*." The side "*c*" is at an angle of approximately 45° below the horizontal plane of the vehicle. The side "*e*" is at an angle of approximately 5° to the right of the centerline of the vehicle. The area of the aperture 62 covered by the filter 64 is bound by the sides "*f*" and "*g*" and that portion of side "*a*" developed by the intersection of the extension of line "*e*" with the side "*a*."

By acceptance angle as referred to in this application, we mean the maximum angle with respect to the conventional axis of the vehicle through which parallel light rays may vary and still reach the cathode of the photosensitive element. All rays which make an angle greater than the acceptance angle are excluded from the cathode of the photosensitive element. The field of response, therefore, of the photosensitive element is determined by its acceptance angle in the vertical and horizontal planes.

The field of response of the light collector 16 is graphically shown in FIGURE 6. It is evident from the graph that the horizontal and vertical acceptange angles of the unit are determined by the shape of the aperture 62. In our preferred embodiment the aperture 62 is positioned at the foal point of the lens 24. The heptagonal shape of the aperture 62 allows a vertical acceptance of 5° above and 3° below the horizontal plane of the vehicle and a horizontal acceptance angle of 5° to the right and 7° to the left of the centerline of the vehicle. It will be noted, however, that the upper vertical acceptance angle of 5° is not obtained throughout the full horizontal acceptance angle of 12°. The full upper vertical acceptance angle of 5° is only realized from about 1.5° to the right and 2° to the left of the centerline of the vehicle. As hereinbefore mentioned, it is necessary to eliminate possible actuation of the dimming system due to overhead lights on the right and left hand sides of the road. To this end the aperture 62 provides, by means of a side "*c*," a diagonal cut off at the upper left-hand portion of the graph. Similar, the sides "*e*" and "*f*" provide a generally right-angular cut out at the upper right-hand portion of the graph.

In addition to the elimination of system actuation by overhead light on the sides of the road, it is necessary to provide means for eliminating system actuation due to reflections from the road and signs along the right-hand side of the road. We have found that most signs along the right-hand side of the road are from 3° on out with reference to the centerline of the vehicle and that the brightest concentration of light from the lower beam occurs on the road directly in front of the vehicle and approximately 3° to the right of the centerline. To prevent unwanted dimming system actuation from light approaching the collector 16 from this area while still providing actuation from approaching vehicles on right-hand turns, we place the filter 64 over this area. The area of the field of response covered by the filter 64 is shown as cross hatched on the graph in FIGURE 6 and covers that portion above and below the horizontal plane of the vehicle extending from about 1.5° to 5° to the right of the centerline of the vehicle. The filter 64 reduces the amount of light reaching the photosensitive element so that only 25 percent transmission occurs in this area. While the system is not responsive to light reflected from signs along the right-hand side of the road, the system will still respond to the headlight of approaching vehicles on right-hand turns due to the greater intensity of this light. Moreover, the reduction of light in this area allows the light collector 16 to be aimed so as to be responsive to light sources located at approximately 3° below the horizontal plane of the vehicle without the system being affected by the reflection of the vehicle's own headlights. This greater "down" angle reduces the effect of car loading on the operation of the system and allows the system to respond more readily to the tail lights of vehicles passing or being approached by a vehicle having an automaitc headlamp dimming system.

Since the size of the aperture 62 determines the field of response of the system, it is useful to use a light-condensing lens which has been corrected for spherical aberration in order to attain a more clearly defined focal point or light focus. When such a lens is used rather than there being a gradual decrease in sensitivity as the angle between the direction of light approach and the lens axis becomes greater, there will be approximately the same magnitude of sensitivity until the approach angle becomes such that the well-defined light focal point reaches the edge of the aperture, at which time there will be a sharp degrease. Thus, the use of a condensing lens corrected for spherical aberration in combination with the aperture 62 aids in giving a uniform sensitivity to light approach from within a predetermined and well-defined field of response.

It is evident from the above that the present invention provides a light collector for a light-actuated control system which gathers light only from within a predetermined field of response and that within this field of response, the system will readily dim for the tail lights of other vehicles but is unaffected by reflections from the vehicle's own headlights and will readily dim for approaching vehicles on right-hand turns but yet is unaffected by signs or other lights on the right-hand side of the road and which moreover is unaffected by vehicle loading.

While we have described our invention with reference to particular embodiments thereof, it is not to be so limited since changes and alterations therein may be made which are within the full-intended scope of this invention as defined by the appended claims:

We claim:

1. A light-gathering device for a photosensitive element mounted in a vehicle, said device comprising a housing enclosing said photosensitive element and having an opening therein, a light-condensing lens in said opening, a shield supported in said housing between said lens and said photosensitive element and having an irregular-shaped aperture therein located at the focal plane of said lens, said aperture limiting the light falling on said photosensitive element to that approaching said opening from within predetermined vertical and horizontal angles, a filter element mounted in said shield to reduce the amount of light falling on said photosensitive element which approaches said opening from a horizontal angle of greater than one degree to the right of the centerline of the vehicle.

2. A light collector for a vehicle headlight dimming system comprising a housing having an opening therein, a photosensitive element mounted in said housing facing said opening, a shield mounted in said housing between said opening and said photosensitive element and having an aperture of concave polygon shape therein, said aperture having first, second, and third sides substantially parallel to the horizontal plane of the vehicle; fourth, fifth, and sixth sides substantially perpendicular to the horizontal plane of the vehicle and having a seventh side making an angle of approximately 45° with the horizontal plane of the vehicle and connecting the third and sixth sides, a filter element mounted in said shield and covering a portion of the aperture located to the left of the centerline of the vehicle.

3. A light collector for a vehicle headlight dimming system comprising a housing having an opening therein, a photosensitive element mounted in said housing facing said opening, a shield mounted in said housing between said opening and said photosensitive element and having a heptagonal-shaped aperture therein, said aperture providing a field of response for said photosensitive element having horizontal acceptance angles of about 5° and 7° to the right and left respectively of the centerline of the vehicle and having vertical acceptance angles of at least 3° below and 2° above the horizontal plane of the vehicle to the right of the centerline of the vehicle, a filter element mounted in said shield and covering a portion of said aperture to reduce the amount of light falling on said photosensitive element which approaches said opening from approximately 3° to the right of said centerline 4. A light collector for a vehicle headlight dimming system comprising a housing having an opening therein,
 a light condensing lens in said opening,
 a photosensitive element mounted in said housing facing said opening,
 a shield mounted in said housing between said lens and said photosensitive element and having an aperture therein,
 the shape of said aperture determining the horizontal and vertical acceptance angles of light reaching said photosensitive element,
 means for adjusting said shield to provide predetermined vertical acceptance angles,
 a filter element mounted in said aperture and covering a portion of said aperture to reduce the amount of light reaching said photosensitive element which eminates from a source within the horizontal acceptance angles of said aperture and to the right of the centerline of the vehicle.

References Cited by the Examiner
UNITED STATES PATENTS

| | | | |
|---|---|---|---|
| 2,423,322 | 7/1947 | Hurley | 250—215 X |
| 2,762,930 | 9/1956 | Onksen et al. | 250—215 |
| 2,762,932 | 9/1956 | Falge et al. | 250—237 X |
| 2,848,651 | 8/1958 | Byrne | 250—214 X |
| 2,917,666 | 12/1959 | Engelmann et al. | 250—226 X |

RALPH G. NILSON, *Primary Examiner.*
WALTER STOLWEIN, *Examiner.*